United States Patent [19]

Konishi et al.

[11] 4,330,264
[45] May 18, 1982

[54] APPARATUS FOR MANUFACTURING VITREOUS SLAG

[75] Inventors: Jirou Konishi; Yasuto Takasaki; Kenji Ohkoshi; Akichika Ozeki; Shuji Kajikawa; Haruo Itoh, all of Fukuyama, Japan

[73] Assignee: Nippon Kokan Kabushiki Kaisha, Tokyo, Japan

[21] Appl. No.: 229,715

[22] Filed: Jan. 29, 1981

[30] Foreign Application Priority Data

Feb. 15, 1980 [JP] Japan .................................. 55-16532

[51] Int. Cl.³ ........................ F27D 15/02; C21B 3/06
[52] U.S. Cl. .................................... 432/77; 266/201; 432/83
[58] Field of Search .................... 432/77, 83; 266/201; 165/94

[56] References Cited

U.S. PATENT DOCUMENTS

| | | | |
|---|---|---|---|
| 752,726 | 6/1903 | Uehling | 266/201 |
| 4,050,884 | 9/1977 | Jablin | |
| 4,098,095 | 7/1978 | Roth | 165/94 |

FOREIGN PATENT DOCUMENTS

| | | | |
|---|---|---|---|
| 45-22066 | 7/1970 | Japan | 432/77 |
| 55-11154 | 1/1980 | Japan | |

*Primary Examiner*—John J. Camby

*Attorney, Agent, or Firm*—Frishauf, Holtz, Goodman and Woodward

[57] ABSTRACT

An apparatus for manufacturing a vitreous slag, which comprises: a pair of cooling drums, the peripheral surfaces of said pair of cooling drums being in contact with each other, and said pair of cooling drums rotating in directions opposite to each other at the same peripheral speed; a pair of weirs provided at the upper halves of the both ends of said pair of cooling drums so as to be in contact with said both ends of said pair of cooling drums, a slag sump being formed by means of said pair of weirs and the bodies of said pair of cooling drums, and molten slag being poured into said slag sump; a cooling medium for cooling said pair of cooling drums, said cooling medium comprising a high boiling point heat medium having a boiling point under 1 atmospheric pressure of at least 200° C., said high boiling point heat medium being fed into each of said pair of cooling drums, exchanging heat with said molten slag in said slag sump, deposited onto the peripheral surfaces of said pair of cooling drums, and being discharged from each of said pair of cooling drums under a pressure of up to 5 kg/cm² for heat recovery, whereby said molten slag is substantially completely converted into a vitreous slag through heat exchange with said high boiling point heat medium, and is peeled off from the peripheral surfaces of said pair of cooling drums by a scraper.

3 Claims, 6 Drawing Figures

APPARATUS FOR MANUFACTURING VITREOUS SLAG

REFERENCE TO PATENTS, APPLICATIONS AND PUBLICATIONS PERTINENT TO THE INVENTION

As far as we know, prior documents pertinent to the present invention are as follows:

(1) Japanese Patent Provisional Publication No. 11,154/80 dated Jan. 25, 1980, and, (2) U.S. Pat. No. 4,050,884 dated Sept. 27, 1977.

The contents of the prior arts disclosed in the above-mentioned prior documents (1) and (2) will be discussed under the heading of the "BACKGROUND OF THE INVENTION" presented hereafter.

FIELD OF THE INVENTION

The present invention relates to an apparatus for manufacturing a vitreous slag adapted to serve particularly as a cement material, which can provide a high cooling rate sufficient to substantially completely vitrify a molten slag.

BACKGROUND OF THE INVENTION

Molten slags include, for example, molten blast furnace slag, molten converter slag, and molten electric furnace slag. It is known that it is possible to obtain a vitreous slag by cooling a molten slag mentioned above at a high cooling rate for solidification.

FIGS. 1 and 2 illustrate an apparatus for manufacturing a vitreous slag, which is substantially the same as the apparatus for manufacturing a vitreous blast furnace slag disclosed in Japanese Patent Provisional Publication No. 11,154/80 dated Jan. 25, 1980. FIG. 1 is a schematic front view illustrating an embodiment of the apparatus for manufacturing a vitreous slag. FIG. 2 is a sectional view of FIG. 1 cut along the line A—A'. In FIG. 1, 1 is an endless conveyor belt; 2 are a pair of sprocket wheels for travelling the endless conveyor belt 1; and 4 are a plurality of rectangular cooling metal members forming the endless conveyor belt 1 by being connected to each other. At least one sprocket wheel 2 is driven by a driving means, whereby the endless conveyor belt 1 travels at a prescribed speed in the arrow direction as shown in FIG. 1. As shown in FIG. 2, each of the plurality of cooling metal members 4 has on the outer surface thereof a plurality of narrow and deep cooling grooves 3, of which the longitudinal direction is substantially parallel to the travelling direction of the endless conveyor belt 1. As shown in FIG. 2, a pushing board 4' having a length substantially equal to the length of the cooling groove 3 and having upset portions at the both ends is fitted to the bottom of each of said plurality of cooling grooves 3, so that one end of said pushing board 4' is inserted into the cooling groove 3 and the other end thereof projects from the back surface of the cooling metal member 4. The pushing board 4' vertically slides in the cooling groove 3 until any one of the upset portions at the both ends thereof reach the bottom surface of the cooling groove 3 or the back surface of the cooling metal member 4.

In FIG. 1, 7 is a molten slag container arranged above a point in the upstream of the upper forwarding position of the endless conveyor belt 1. The molten slag container 7 receives, for example, a molten slag 5 from a blast furnace (not shown) through a feeding trough 6. The molten slag 5 in the molten slag container 7 is poured through a pouring nozzle 7a provided at the bottom of the molten slag container 7 into the plurality of cooling grooves 3 of the cooling metal members 4 which are in travel, and rapidly cooled and solidified at a high cooling rate by the cooling metal members 4 forming the cooling grooves, substantially completely into a vitreous slag.

As shown in FIG. 1, when the cooling metal member 4 full of solidified vitreous slag 5' reaches a point in the downstream of the upper forwarding position of the endless conveyor belt 1, the pushing board 4' of the cooling metal member 4 is pushed into the cooling grooves 3 by a stripper 8 comprising rollers fixed to the inside of the endless conveyor belt 1, whereby the solidified vitreous slag 5' in the cooling grooves 3 is pushed out from the cooling grooves 3 in granular form and discharged onto the chute 9. The vitreous slag 5' discharged onto the chute 9 is received in a hopper 11 through a transfer conveyor 10. The empty cooling metal member 4 after removal of the vitreous slag 5' reaches the lower returning position of the endless conveyor belt 1 along with the travel of the endless conveyor belt 1, and at this position, the cooling metal member 4 is blown with cooling water from spray nozzles 12 and thus cooled to a prescribed temperature.

The above-mentioned apparatus for manufacturing a vitreous slag using an endless conveyor belt has a high cooling rate sufficient to substantially completely vitrify a molten slag. According to this apparatus, therefore, it is possible to manufacture a vitreous slag substantially completely vitrified which has an excellent quality as a cement material. The above-mentioned apparatus for manufacturing a vitreous slag using an endless conveyor belt has however a complicated structure, and it is very difficult, with this apparatus, to recover a high-temperature heat contained in the cooling metal members 4 through heat exchange with the molten slag.

To solve this diffculty, there has been proposed an apparatus for manufacturing a vitreous slag using cooling drums. FIG. 3 illustrates the apparatus for manufacturing a vitreous slag, which is substantially the same as the apparatus for manufacturing a vitreous slag disclosed in the U.S. Pat. No. 4,050,884 dated Sept. 27, 1977. More particularly, FIG. 3 is a schematic sectional view illustrating an embodiment of the apparatus for manufacturing a vitreous slag. In FIG. 3, 13 is an enclosed-structure housing. The housing 13 has an opening 13a at the top thereof for passing a molten slag, and a discharge port 13b at the lower end thereof for discharging a crushed vitreous slag. In the housing 13, a pair of cooling drums 14 with the same diameter and the same length are arranged so that the axial directions thereof are parallel to each other in the same horizontal level and the peripheral surfaces thereof are in contact with each other. Each of the pair of cooling drums 14 is rotated, by a driving means (not shown), in directions opposite to each other at the same peripheral speed, as shown by the arrows "a", "a'" in FIG. 3, i.e., in the rising direction of the peripheral surface thereof at the contact portion of the pair of cooling drums 14. A plurality of cooling through-holes (not shown) are pierced in the peripheral wall of each of the plurality of cooling drums 14 in the axial direction thereof. One end of each of the plurality of cooling through-holes communicates with the interior of a hollow portion (not shown) of one end of the center axle of the cooling drum, and the other end of the cooling through-holes communicates with the interior of a hollow portion (not shown) of the other end of the center axle of the cooling drum. The hollow portion (not shown) of the one end of the center axle of the cooling drum 14 is liquid-tightly connected, through a swivel joint (not shown), to one end of a pipe 42. The other end of the pipe 42 is connected to the inlet of a steam drum 18. An end of another pipe 44 provided with a pump 43 on the way is connected to the hot water outlet of the stream drum 18. In FIG. 3, 18a is an air feed valve and 18b is a water supply valve. The other end of the pipe 44 is liquid-tightly connected, through a swivel joint (not shown), to the hollow portion (not shown) of the other end of the center axle of the cooling drum 14. In FIG. 3, the steam drum 18 is connected to one of the cooling drums 14, but another steam drum (not shown) is similarly connected also to the other cooling drum 14. Therefore, cooling water for cooling the cooling drum 14 is supplied, through the pipe 44 and the axle in the peripheral wall of the cooling drum 14, to the plurality of cooling through-holes of the periphery of the cooling drum 14 by means of the pump 43. The cooling water supplied to the plurality of cooling through-holes is heated by the heat contained in the molten slag 5 deposited onto the peripheral surface of the cooling drum 14 as described later and supplied, through the axle of the cooling drum 14 and the pipe 42, to the steam drum 18 while partially generating steam. The pressurized steam supplied to the steam 18 is separated, in the steam drum 18, into steam and hot water. The hot water separated in the steam drum 18 is supplied again, as the cooling water, to the plurailty of cooling through-holes in the peripheral wall of the cooling drum 14 through the pipe 44 by means of the pump 43. Thus, the cooling water circulates between the cooling drum 14 and the steam drum 18. The steam separated in the steam drum 18 is, on the other hand, used for driving, for example, a turbine (not shown).

A pair of weirs 16 are provided at the upper halves of the both ends of the pair of cooling drums 14 so as to be in contact with the both ends of the pair of cooling drums 14 (FIG. 3 shows only one of the pair of weirs 16). The top ends of the pair of weirs 16 are connected by a cover 16' having at the center thereof an opening 16'a. The pair of weirs 16 and the cover 16' are supported on the housing 13 by means of a supporting means (not shown). A slag sump 45 is formed by the bodies of the pair of cooling drums 14 and the pair of weirs 16. The molten slag 5 from a slag runner 15 is poured, through the opening 13a of the housing 13 and the opening 16'a of the cover 16', into the slag sump 45, where a slag pool is formed. The molten slag 5 poured into the slag sump 45 is deposited onto the peripheral surfaces of the cooling drums 14 during rotation, rapidly cooled and solidified, substantially completely into a vitreous slag. The cooling water supplied to the plurality of cooling through-holes in the peripheral wall of the cooling drum 14 is heated by the molten slag 5 deposited onto the peripheral surfaces of the cooling drums 14 into a pressurized steam. When the solidified vitreous slag 5' reaches the lower halves of the cooling drums 14 along with the rotation of the cooling drums 14, the vitreous slag 5' deposited onto the peripheral surfaces of the cooling drums 14 is peeled off therefrom, while being crushed, by a scraper 17 supported on the housing 13 by means of a supporting means (not shown), and drops into the lower part of the housing 13. An opening and closing means (not shown) is provided in the discharge port 13b of the lower part of the housing 13. The peripheral surfaces of the cooling drums 14 from which the vitreous slag 5' has been peeled off by the scraper 17 comes again into contact with the molten slag 5 in the slag sump 45 along with the rotation of the cooling drums 14, whereby a vitreous slag is continuously manufactured.

According to the above-mentioned apparatus for manufacturing a vitreous slag using cooling drums, it is possible to continuously manufacture a vitreous slag, and still recover a high-temperature heat contained in the cooling drums 14 through heat exchange with the molten slag. However, the above-mentioned apparatus for manufacturing a vitreous slag using a pair of cooling drums involves the following problems: Since water is supplied, as the cooling medium, to the cooling through-holes provided in the peripheral wall of the cooling drum 14, effective recover of a high-potential high-temperature steam requires conversion of the cooling water into steam with a very high pressure. Production of such a high-pressure steam in the cooling through-holes in the peripheral wall of the cooling drum 14 which is subjected to serious repetition of heating and cooling by the contact with the high-temperature slag pool in the slag sump 45 is not desirable in safety, because of the risk of cracking and explosion of the cooling drums after the lapse of a certain period of time. Furthermore, application of a high pressure to the swivel joint is not desirable from the practical point of view.

The molten slag deposited onto the peripheral surfaces of the cooling drums 14 in rotation is rapidly cooled and solidified into a vitreous slag. The vitreous slag thus obtained forms a layer with a prescribed thickness on the peripheral surfaces of the cooling drums 14, and remains in this state without being subjected to any constraint until it is peeled off from the peripheral surfaces of the cooling drums 14 by the scraper 17. Therefore, the vitreous slag deposited onto the peripheral surfaces of the cooling drums 14 is peeled off therefrom from while being crushed, by the scraper 17, and drops down. Very large pieces of vitreous slag sometimes drop into the lower part of the housing 13. As a result, the discharge port 13b at the lower part of the housing 13 is clogged, thus making it difficult to smoothly remove vitreous slag gathering in the lower part of the housing 13 through the discharge port 13b, and also making the subsequent handling more troublesome.

SUMMARY OF THE INVENTION

A principal object of the present invention is therefore to provide an apparatus for manufacturing a vitreous slag, which gives a high cooling rate sufficient to substantially completely vitrify a molten slag.

An object of the present invention is to provide an apparatus for manufacturing a vitreous slag, which permits very safe and effective recovery of the heat obtained at the time of cooling and solifying a high-temperature molten slag into a vitreous slag as a high-potential high-temperature heat.

Another object of the present invention is to provide an apparatus for manufacturing an easy-to-handle leaf-shaped vitreous slag with a uniform size excellent in crushability.

In accordance with one of the features of the present invention, there is provided an apparatus for manufacturing a vitreous slag, which comprises:

a pair of cooling drums having the same diameter and the same length, the axial directions of said pair of cooling drums being arranged prallel to each other in the same horizontal level, and the peripheral surfaces of said pair of cooling drums being in contact with each other;

a driving means for rotating said pair of cooling drums, said driving means being adapted to rotate said pair of cooling drums in directions opposite to each other at the same peripheral speed in the rising direction of the peripheral surface of each of said pair of cooling drums, at the contact portion of said pair of cooling drums;

a pair of weirs provided at the upper halves of the both ends of said pair of cooling drums so as to be in contact with said both ends of said pair of cooling drums, a slag sump being formed by means of said pair of weirs and the bodies of said pair of cooling drums;

a slag feed means, arranged above said pair of cooling drums, for pouring a molten slag into said slag sump;

a scraper provided so as to be in contact with the lower halves of the peripheral surfaces of said pair of cooling drums;

a cooling medium for cooling said pair of cooling drums, said cooling medium being supplied, through the center axle of each of said pair of cooling drums, into each of said pair of cooling drums, said cooling medium exchanging heat with said molten slag in said slag sump, deposited onto the peripheral surfaces of said pair of cooling drums, along with the rotation of said pair of cooling drums, and said cooling medium which has exchanged the heat with said molten slag being discharged through said center axle of each of said pair of cooling drums for heat recovery, whereby said molten slag deposited onto the peripheral surfaces of said pair of cooling drums is converted into a vitreous slag through heat exchange with said cooling medium, along with the rotation of said pair of cooling drums, and peeled off from the peripheral surfaces of said pair of cooling drums by said scraper;

said apparatus being characterized in that:

said cooling medium comprises a high boiling point heat medium having a boiling point under 1 atmospheric pressure of at least 200°C., and said high boiling point heat medium is discharged, through said center axle of each of said pair of cooling drums, from each of said cooling drums under a low pressure of up to 5 kg/cm².

BRIEF DESCRIPTION OF THE DRAWINGS

FIG. 4 is a schematic sectional view illustrating an embodiment of the apparatus for manufacturing a vitreous slag of the present invention;

DETAILED DESCRIPTION OF PREFERRED EMBODIMENTS

Figure 1:
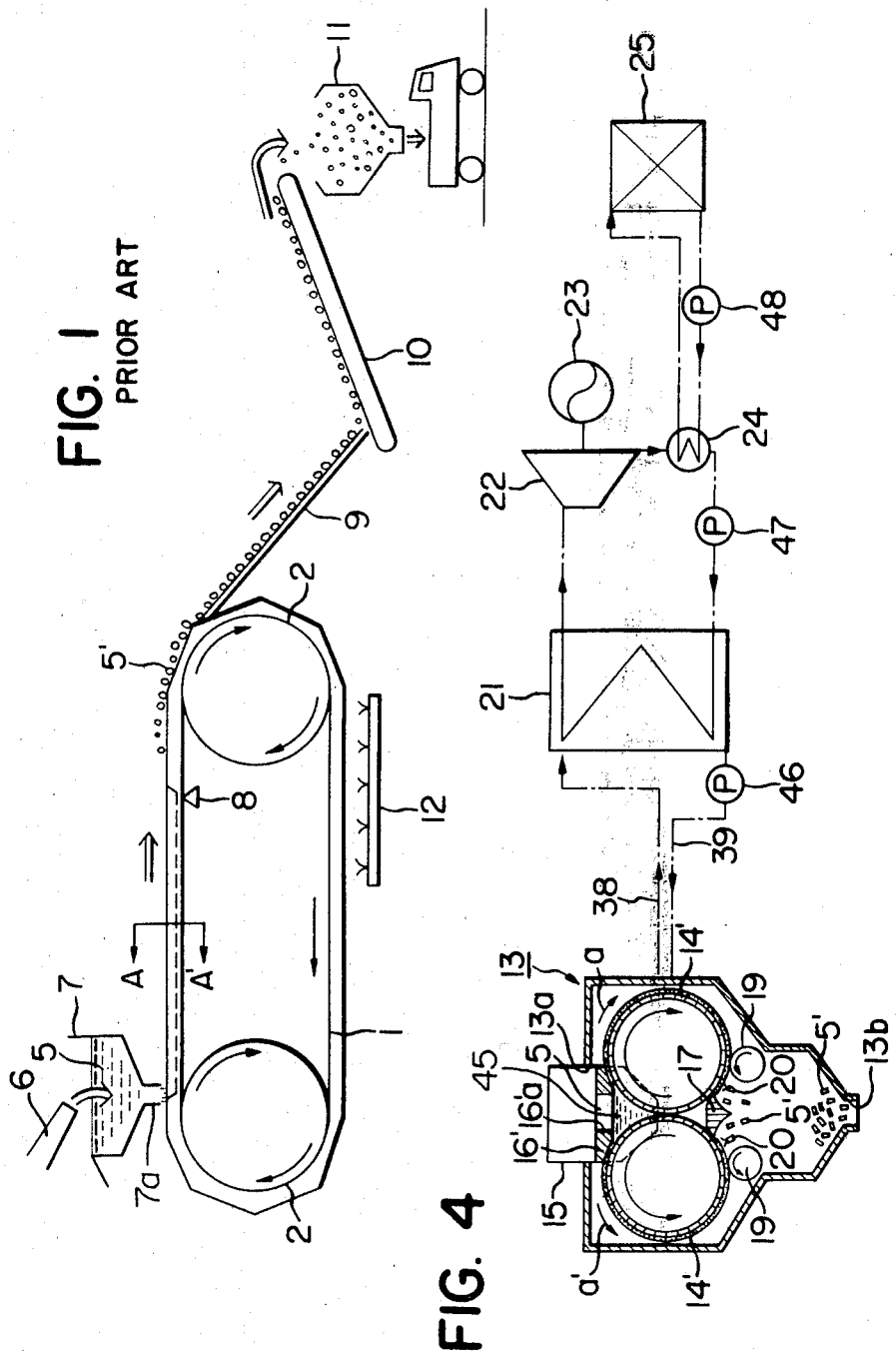
FIG. 1 is a schematic front view illustrating an embodiment of the conventional apparatus for manufacturing a vitreous slag.
Figure 2:
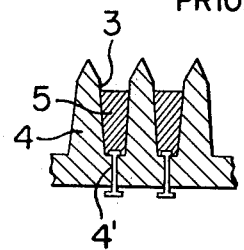
FIG. 2 is a sectional view of FIG. 1 cut along the line A—A'.

With a view to solving the above-mentioned problems involved in the conventional apparatus for manufacturing a vitreous slag using a pair of cooling drums, we carried out extensive studies, and obtained as a result the following findings:

High boiling point heat media are known to be applicable as cooling media. For many high boiling point heat media, the boiling point falls within the range of from 200° to 350° C. under 1 atmospheric pressure. The boiling point for such a high boiling point heat medium under 1 atmospheric pressure is far higher than that for water. Accordingly, by employing a high boiling point heat medium as the cooling medium of the cooling drum, it is possible to discharge the high boiling point heat medium to outside from the cooling drum under a pressure far lower than the pressure of steam obtained in the cooling through-holes provided in the peripheral wall of the cooling drum when cooling the cooling drum with water circulating in the cooling through-holes, the pressure of the former being substantially the same as the atmospheric pressure. It is also possible to form the cooling drum with a thin wall. As a result, it is possible to recover a high-potential high-temperature heat obtained when cooling and solidifying a molten slag into a vitreous slag while very safely keeping the internal pressure of the cooling drum at substantially the same level as the atmospheric pressure, and also to ensure prevention of steam leakage from junctions such as a swivel joint arranged between the center axle of the cooling drum and a pipe connected to a heat exchanger.

The present invention was developed on the basis of the above-mentioned findings, and relates to an apparatus for manufacturing a vitreous slag, which comprises:

a pair of cooling drums having the same diameter and the same length, the axial directions of said pair of cooling drums being arranged parallel to each other in the same horizontal level, and the peripheral surfaces of said pair of cooling drums being in contact with each other;

a driving means for rotating said pair of cooling drums, said driving means being adapted to rotate said pair of cooling drums in directions opposite to each other at the same peripheral speed in the rising direction of the peripheral surface of each of said pair of cooling drums, at the contact portion of said pair of cooling drums;

a pair of weirs provided at the upper halves of the both ends of said pair of cooling drums so as to be in contact with said both ends of said pair of cooling drums, a slag sump being formed by said pair of weirs and the bodies of said pair of cooling drums;

a slag feed means, arranged above said pair of cooling drums, for pouring a molten slag into said slag sump;

a scraper provided so as to be incontact with the lower halves of the peripheral surfaces of said pair of cooling drums;

a cooling medium for cooling said pair of cooling drums, said cooling medium being supplied, through the center axle of each of said pair of cooling drums, into each of said pair of cooling drums, said cooling medium exchanging heat with said molten slag in said slag sump, deposited onto the peripheral surfaces of said pair of cooling drums, along with the rotation of said pair of cooling drums, and said cooling medium which hs exchanged the heat with said molten slag being discharged through said center axle of each of said pair of cooling drums for heat recovery, whereby said molten slag deposited onto the peripheral surfaces of said pair of cooling drums is converted into a vitreous slag through heat exchange with said cooling medium, along with the rotation of said pair of cooling drums, and peeled off from the peripheral surfaces of said pair of cooling drums by said scraper;

said apparatus being characterized in that:

said cooling medium comprises a high boiling point heat medium having a boiling point under 1 atmospheric pressure of at least 200° C., and said high boiling point heat medium is discharged, through said center axle of each of said pair of cooling drums, from each of said cooling drums under a low pressure of up to 5 kg/cm².

In the present invention, the cooling medium should be a high boiling point heat medium having a boiling point of at least 200° C. under 1 atmospheric pressure, because with a high boiling point heat medium with a boiling point of under 200° C. under 1 atmospheric pressure, it is impossible to efficiently recover a high-potential heat from the high boiling point heat medium discharged from the cooling drums. If the high boiling point heat medium having a boiling point of under 200° C. under 1 atmospheric pressure discharged from the cooling drums is supplied to a heat exchanger for generating steam, said heat exchanger cannot generate a steam having a high pressure, i.e., a pressure of at least 15 kg/cm² which is adapted to drive a turbine.

The pressure of the high boiling point heat medium discharged from the cooling drums should be up to 5 kg/cm², because, in order to take out a high boiling point heat medium with a pressure of over 5 kg/cm² from the cooling drums, the cooling drums, the swivel joints and the pipes should withstand high pressures, thus resulting in far higher installation costs and a decreased operational safety.

Now, the apparatus for manufacturing a vitreous slag of the present invention is described in detail with reference to the drawings.

FIG. 4 is a schematic sectional view illustrating an embodiment of the appartus for manufacturing a vitreous slag of the present invention. In FIG. 4, 13 is an enclosed-type housing. The housing 13 has an opening 13a at the top end thereof for passing a molten slag, and a discharge port 13b at the lower end thereof for discharging the crushed vitreous slag. The discharge port 13b is provided with an opening and closing means (not shown). A pair of cooling drums 14' having the same diameter and the same length are arranged in the housing 13 so that the axial directions of the pair of cooling drums 14' are parallel to each other in the same horizontal level and the peripheral surfaces of the pair of cooling drums 14' are in contact with each other. The pair of cooling drums 14' are rotated, by means of a driving means as described later, in the directions shown by the arrows "a" and "a'" in FIG. 4 i.e., in directions opposite to each other at the same peripheral speed in the rising direction of the peripheral surface of each of the pair of cooling drums 14', at the contact portion of the pair of cooling drums.

In FIG. 4, 21 is a heat exchanger, of which the details will be described later. A high boiling point heat medium as the cooling medium circulates between the inside of each of the pair of cooling drums 14' and the radiating section of the heat exchanger 21. A pump 46 is provided between the exit side of the radiating section of the heat exchanger 21 and the cooling drums 14', for supplying the liquid high boiling point heat medium from the exit side of the radiating section of the heat exchanger 21 to the inside of the cooling drums 14'. As described later, by arranging the heat exchanger 21 at a position higher than the cooling drums 14', it is possible to supply the liquid high boiling point heat medium from the exit side of the radiating section of the heat exchanger 21 to the inside of the cooling drums 14' by its own gravity without using the pump 46.

A pair of weirs 16 are provided at the upper halves of the both ends of the pair of cooling drums 14' so as to be in contact with the ends of the pair of cooling drums 14' (the weir 16 only on one side is shown in FIG. 4). The upper ends of the pair of weirs 16 are connected by means of a cover 16' having an opening 16'a at the center thereof. The pair of weirs 16 and the cover 16' are supported on the housing 13 through a supporting means (not shown). A slag sump 45 is formed by the bodies of the pair of cooling drums 14' and the pair of weirs 16. An end of a slag runner 15 is arranged above the pair of cooling drums 14' as the slag supplying means for pouring the molten slag 5 into the slag sump 45. Therefore, a molten slag 5 from the slag runner 15 is poured into the slag sump 45 through the opening 13a of the housing 13 and the opening 16'a of the cover 16', and forms a slag pool there. The molten slag 5 poured into the slag sump 45 is deposited in a substantially uniform thickness onto the peripheral surfaces of the cooling drums 14' in rotation, and rapidly cooled and solidified by the periphery of the cooling drums 14' substantially into a vitreous slag.

As shown in FIG. 4, a scraper 17 is provided so as to be in contact with the lower halves of the peripheral surfaces of the pair of cooling drums 14'. Each of a pair of pinch rolls 19 having substantially the same length as the cooling drums 14' is provided in the lower half of each of the pair of cooling drums 14' at a position on the upstream side of the scraper 17 relative to the rotating direction of each of the cooling drums 14', so as to be in contact with the layer of the vitreous slag deposited onto the peripheral surfaces of the cooling drums 14'. Each of a pair of spray nozzles 20 is provided adjacent to the peripheral surface of each of the pair of cooling drums 14', for ejecting water to the vitreous slag deposited onto the peripheral surfaces of the cooling drums 14' at a position between the scraper 17 and each of the pinch rolls 19. The scraper 17, the pair of pinch rolls 19, and the pair of spray nozzles 20 are supported on the housing 13 through supporting means (not shown). Therefore, when the vitreous slag 5' deposited onto the peripheral surfaces of the cooling drums 14' reaches the lower half of the cooling drums 14' along with the rotation of the cooling drums 14', the vitreous slag 5' is pushed by means of the pair of pinch rolls 19 against the peripheral surfaces of the cooling drums 14' and constrained, applied with a tensile force toward the downstream side relative to the rotating direction of the cooling drums 14' under the effect of rotation of the pinch rolls 19. Then, water is ejected from the spray nozzles 20 onto the vitreous slag 5', and then, the vitreous slag 5' is peeled off from the peripheral surfaces of the cooling drums 14' by the scraper 17 and drops into the lower part of the housing 13 while being crushed. Thus, since the vitreous slag 5' deposited onto the peripheral surfaces of the cooling drums 14' is pushed by the pinch rolls 19 against the peripheral surfaces of the cooling drums 14' and constrained, the vitreous slag 5' deposited onto the peripheral surfaces of the cooling drums 14' is crushed by the scraper 17 to a size corresponding to the distance between the scraper 17 and the pinch rolls 19. In addition, the vitreous slag 5' deposited onto the peripheral surfaces of the cooling drums 14' is rapidly cooled by ejecting water from the spray nozzles 20 in the space between the scraper 17 and the pinch rolls 19, and consequently, drops into the lower part of the housing 13 in the form of a vitreous slag 5' excellent in crushability.

In FIG. 4, 22 is a turbine driven by a high-pressure steam from the exit side of the heat inlet section of the heat exchanger 21; 23 is an electric generator driven by the turbine 22; 24 is a condenser connected to the turbine 22; 47 is a pump for supplying the water from the condenser 24 to the entry side of the heat inlet section of the heat exchanger 21; 25 is a cooling tower for cooling water of the condenser 24; and, 48 is a pump for circulating the cooling water of the condenser 24 between the cooling tower 25 and the condenser 24.

Figure 5:
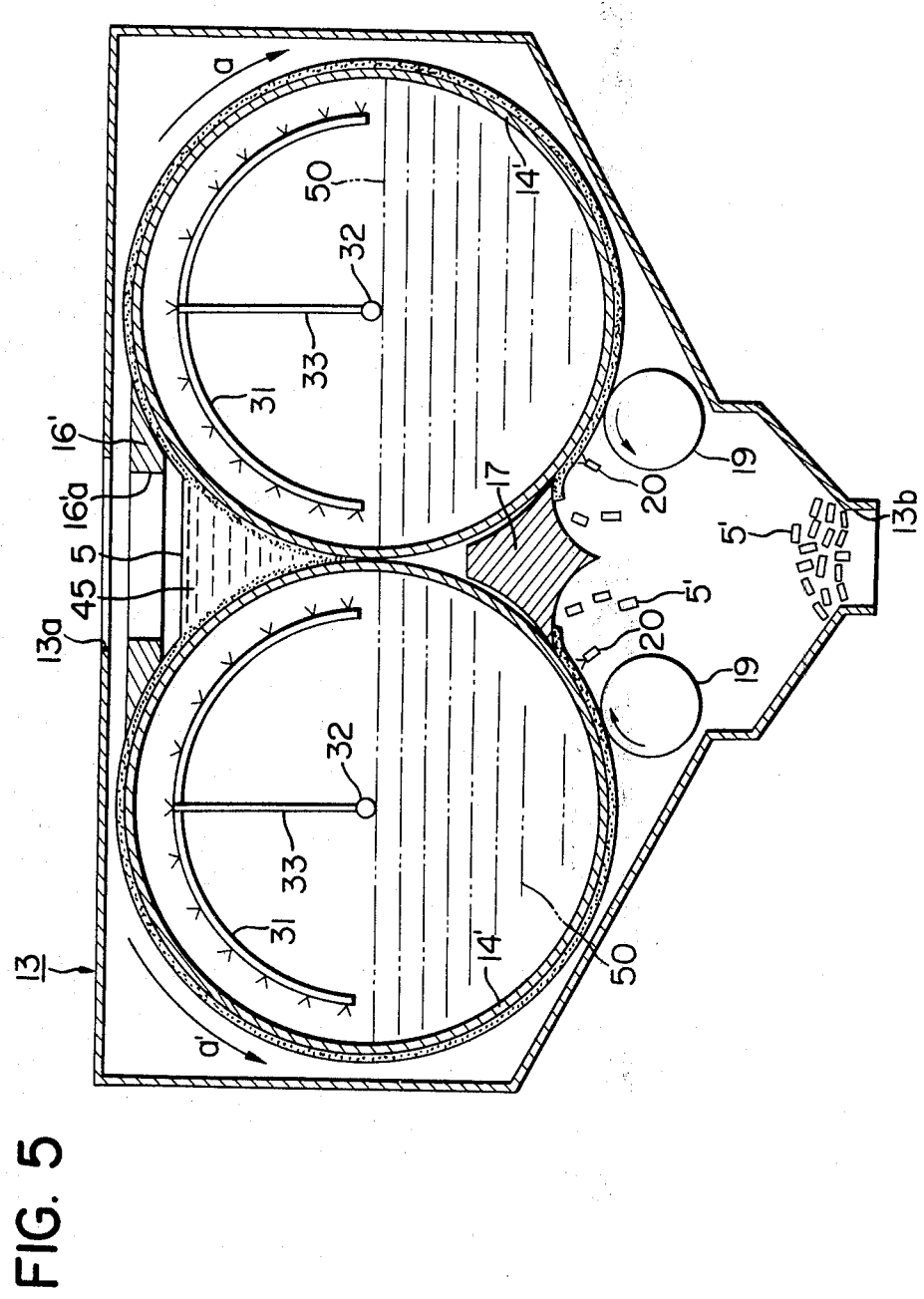
FIG. 5 is a cross-sectional view illustrating an embodiment of a cooling drum which is one of the components of the apparatus for manufacturing a vitreous slag of the present invention; and, FIG. 6 is a longitudinal sectional view illustrating an embodiment of a cooling drum which is one of the components of the apparatus for manufacturing a vitreous slag of the present invention.
Figure 6:
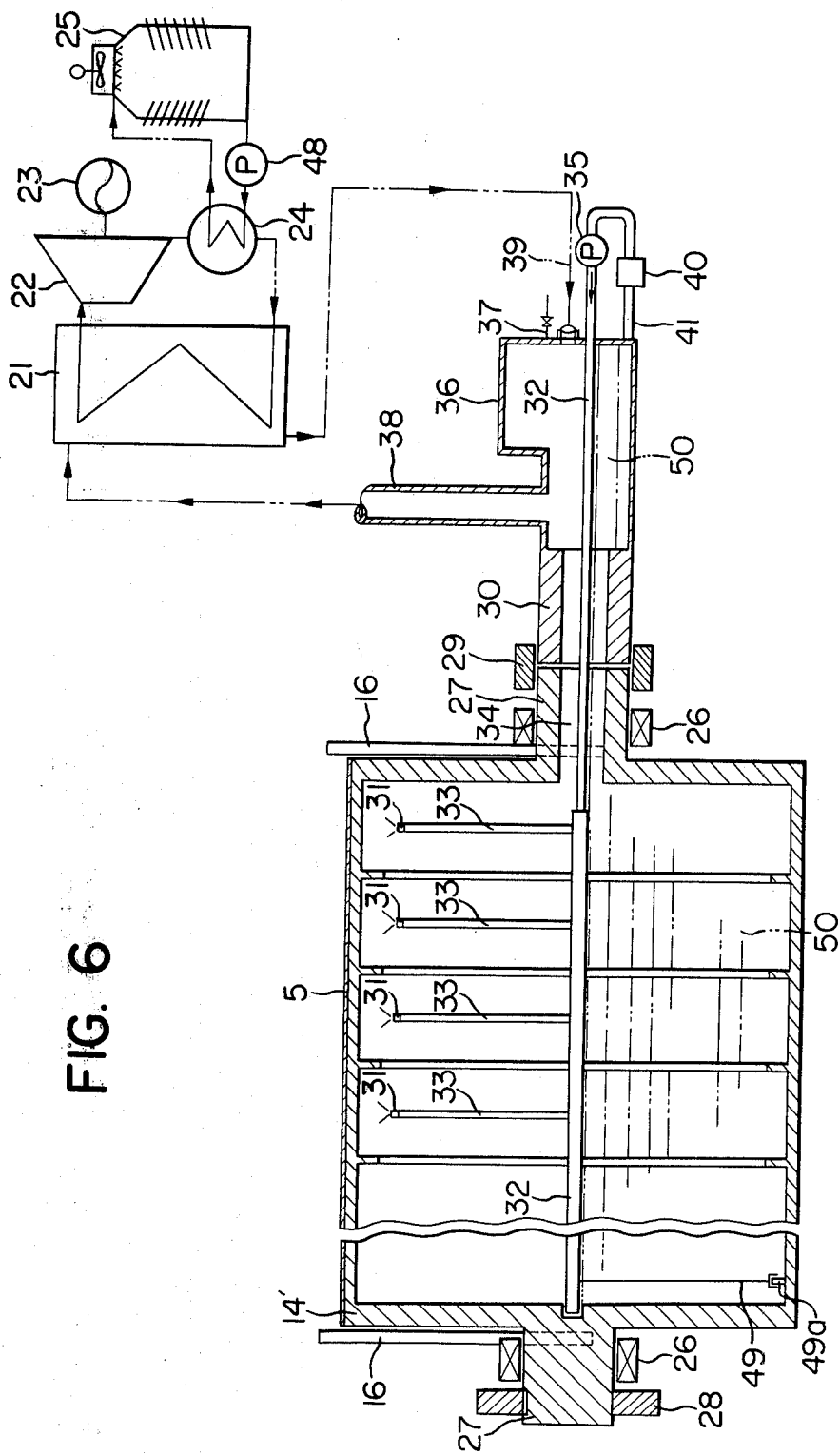

FIG. 5 is a cross-sectional view illustrating an embodiment of the cooling drum, which is one of the components of the apparatus for manufacturing a vitreous slag of the present invention. FIG. 6 is a longitudinal sectional view illustrating an embodiment of the cooling drum, which is one of the components of the apparatus for manufacturing a vitreous slag of the present invention.

As shown in FIG. 6, the center axle 27 of the cooling drum 14' is rotatably supported at the both ends thereof by a pair of bearings 26. A driven gear 28 is fitted to one end of the center axle 27 of the cooling drum 14', and is connected to a driving source (not shown). The cooling drum 14' is rotated by actuating the driving source. A hollow portion 34 communicating with the inside of the cooling drum 14' is formed at the other end of the center axle 27 of the cooling drum 14'. As shown in FIG. 6, one end of a pipe 30 having a hollow portion fixed to a prescribed point so as to be arranged on the same axis as the center axle 27 of the cooling drum 14' is liquid-tightly connected with the other end of the center axle 27 of the cooling drum 14' by a swivel joint 29. A box 36 for cooling medium is connected to the other end of the pipe 30. A feed pipe 32 for cooling medium is provided through the inside of the cooling drum 14', the hollow portion 34 of the center axle 27, the hollow portion of the pipe 30, and the inside of the box 36 so as to be arranged along the central axis of the cooling drum 14'. A roller 49a of the tip of a supporting rod 49 fitted to an end of the feed pipe 32 is in contact with the back peripheral surface of the cooling drum 14'. The other end of the feed pipe 32 is supported by a supporting means (not shown) outside the box 36, and thus the feed pipe 32 is stationarily fixed in the inside of the cooling drum 14' in rotation.

As shown in FIGS. 5 and 6, a plurality of vertically directed branch pipes 33 are fitted to the upper side of the feed pipe 32 in the inside of the cooling drum 14' so that the cooling medium may be ejected along the longitudinal direction of the feed pipe 32 uniformly to the back peripheral surface of the cooling drum 14', and semicircular-shaped nozzles 31 are fitted to the top ends of the plurality of branch pipes 33 so as to be equally spaced from the back peripheral surface of the cooling drum 14'. As shown in FIG. 6, a pump 35 is provided on the feed pipe 32 at a point outside the box 36. An end of a discharge pipe 41 is fitted to the bottom of the box 36, and the discharge pipe 41 and the other end of the feed pipe 32 are connected through a filter 40. A supply pipe 37 of the high boiling point heat medium is fitted to the box 36. The lower part of the inside of the cooling drum 14', the lower part of the hollow portion of the other end of the center axle 27, the lower part of the hollow portion of the pipe 30, and the lower part of the inside of the box 36 are filled with the liquid high boiling point heat medium 50 as the cooling medium. Therefore, the high boiling point heat medium 50 taken out from the bottom of the box 36 through driving of the pump 35 is uniformly sprayed, through the discharge pipe 41, the filter 40, feed pipe 32, pump 35, the plurality of branch pipes 33 and the plurality of nozzles 31, onto the back peripheral surface of the upper half of the cooling drum 14' in rotation. The high boiling point heat medium 50 thus sprayed onto the back peripheral surface of the cooling drum 14' is vaporized by coming into contact with the back peripheral surface of the cooling drum 14' having become heated to a high temperature by the molten slag 5 deposited onto the peripheral surface of the cooling drum 14' (the cooling drum 14' is cooled by the evaporation latent heat of the high boiling point heat medium 50). As mentioned above, the pressure of the vapor of the high boiling point heat medium generated in the inside of the cooling drum 14' is far lower than that of water at the same temperature. Therefore, it is possible to adjust the vapor pressure in the inside of the cooling drum 14', thus permitting very safe operations. The vapor in the inside of the cooling drum 14' is supplied to the entry side of the radiating section of the heat exchanger 21 arranged at a position higher than the cooling drum 14' through the hollow portion of the other end of the center axle 27, the hollow portion of the pipe 30, the box 36, and the discharge pipe 38 fitted to the box 36, under the effect of a very slight pressure difference between the inside of the cooling drum 14' and the inside of the radiating section of the heat exchanger 21, while leakage from the swivel joint 29 is securely prevented. The high boiling point heat medium 50 having been subjected to heat exchange in the heat exchanger 21 and condensed into the liquid state returns from the exit side of the radiating section of the heat exchanger 21 through a return pipe 39 into the box 36 by gravity. The above-mentioned pipe 30, discharge pipe 38 and return pipe 39 may be referred to as "liason pipes". As is clear from FIG. 6, and from the above description, the heat exchanger 21 communicates with each of the pair of cooling drums 14' through the center axle 27 and the liaison pipes 30, 38 and 39 of each of the pair of cooling drums 14'. Since the high boiling point heat medium 50 is vaporized in the inside of the cooling drum 14' and the resultant vapor has a low pressure, the heat obtained during cooling and solidification of the molten slag 5 into a vitreous slag by the peripheral surface of the cooling drum 14' is very safely recovered as a high-potential high-temperature heat. In addition, it is not necessary to forcedly circulate the high boiling point heat medium, thus eliminating the necessity of such facilities as pumps for this purpose.

Figure 3:
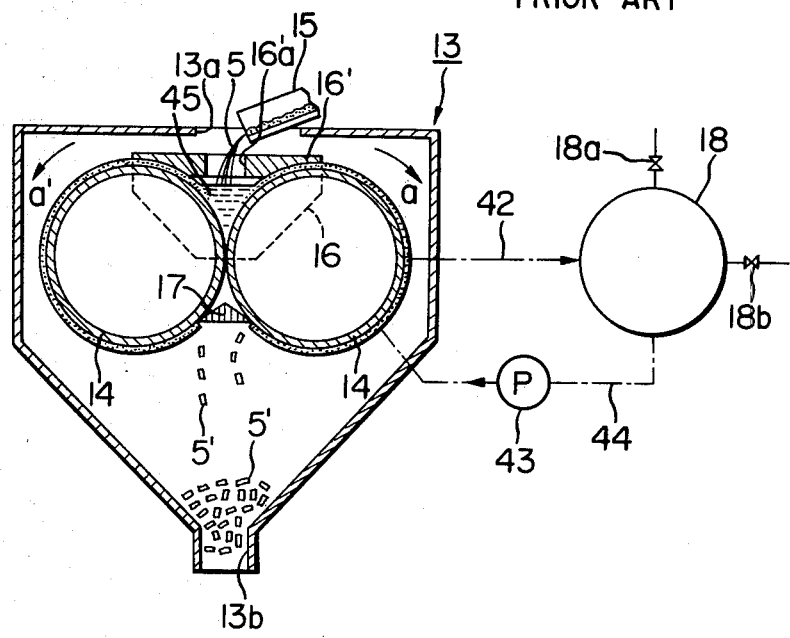
FIG. 3 is a schematic sectional view illustrating another embodiment of the conventional apparatus for manufacturing a vitreous slag.

The pressurized steam obtained through heat exchange with the vapor of the high boiling point heat medium in the heat exchanger 21 may be used, in place of driving a turbine, in such other applications as room heating in the plant. By properly setting the amount of spray of the high boiling point heat medium from the nozzles 31 and by employing an appropriate material as the high boiling point heat medium, it is possible to cause the high boiling point heat medium sprayed from the nozzles 31 onto the back peripheral surface of the cooling drum 14' to flow down into the inside lower half of the cooling drum 14', without causing vaporization thereof (the high boiling point heat medium having flown down into the inside lower half of the cooling drum 14' has a temperature of under the boiling point thereof, and is hence in the liquid state). It is thus possible to decrease the temperature of the liquid high boiling point heat medium taken out from the box 36 by means of a heat exchanger (not shown) provided on the feed pipe 32 on the exit side of the pump 35, and therefore to very safely recover, as a low-pressure high-temperature heat, the heat obtained while the peripheral surfaces of the cooling drums 14' cool and solidify the molten slag 5 into a vitreous slag. It is also possible to spray the liquid high boiling point heat medium thus cooled from the nozzles 31 onto the back peripheral surface of the cooling drum 14'. In an apparatus having a construction as shown in FIG. 3, the heat may be recovered very safely at a low pressure and at a high temperature by employing a heat exchanger in place of the steam drum 18, and a high boiling point heat medium as the cooling medium.

Adhesion of the molten slag 5 onto the peripheral surface of the cooling drum 14' may be improved by providing on the peripheral surface of the cooling drum 14' with a plurality of grooves in the circumferential direction of the cooling drums 14'.

EXAMPLE

A pair of cooling drums 14' were prepared, which were made of copper of a thickness of 20 mm, having the construction described above with reference to FIGS. 5 and 6, an outside diameter of 2 m and a length of 2 m. On the peripheral surface of each of the pair of cooling drums 14', 100 grooves were provided at intervals of 20 mm in the circumferential direction of the cooling drum 14', each of which had a width of 0.5 mm, a depth of 0.5 mm.

Six nozzles 31 were provided at prescribed intervals in the inside of the cooling drums 14'.

As the high boiling point heat medium, the product of Dow Chemicals Corporation known as "Dowtherm A" was employed, which has a boiling point of 257° C. under 1 atmospheric pressure.

Then, a molten blast furnace slag, as the molten slag 5, was poured from the slag runner 15, through the opening 13a of the housing 13 and the opening 16'a of the cover 16', into the slag sump 45, while rotating the pair of cooling drums 14' in directions opposite to each other at a peripheral speed of 5 rpm, and while spraying "Dowtherm A" from the six nozzles 31. The pured molten blast furnace slag was deposited with a thickness of about 3.1 mm onto the peripheral surfaces of the cooling drums 14'. The deposited molten blast furnace slag was rapidly cooled at a high cooling rate by the peripheral surfaces of the cooling drums 14' substantially completely into a vitreous slag. Then, the vitreous slag deposited onto the peripheral surfaces of the cooling drums 14' was pushed against the peripheral surfaces of the cooling drums 14' by the pair of pinch rolls 19, subjected to water spray from the pair of spray nozzles 20, peeled off from the peripheral surfaces of the cooling drums 14' by the scraper 17, and dropped into the lower part of the housing 13 while being crushed. It was possible to take out very easily the vitreous slag having dropped into the lower part of the housing 13 through the discharge port 13b at the lower part of the housing 13. The vitreous slag taken out from the discharge port 13b was excellent in crushability and showed a ratio of vitrification of 95%. In order to vitrify a molten slag sustantially completely, it was found to be effective to cool the molten slag so as to satisfy a cooling rate of at least 180° C./sec within the temperature range of from 1,400° to 500° C.

On the other hand, the liquid "Dowtherm A" sprayed onto and in contact with the back peripheral surfaces of the cooling drums 14' was vaporized into a vapor of approximately 1 atmospheric pressure in the inside of the cooling drums 14'. The "Dowtherm A" having become the vapor in the inside of the cooling drums 14' was taken out from the cooling drums 14' at a pressure of about 1 atmospheric pressure, through the hollow portion 34 of the center axle 27, the hollow portion of the pipe 30, the inside of the box 36 and the discharge pipe 38, supplied to the entry side of the radiating section of the heat exchanger 21, in which the vaporized "Dowtherm A" becomes liquid through condensation, and was returned into the box 36 from the exit side of the radiating section of the heat exchanger 21, through the return pipe 39. There was found no leakage of vapor and liquid from the swivel joint 29. The steam for driving the turbine 22, obtained on the exit side of the heat inlet section of the heat exchanger 21 was in an amount of 24 tons/hour and had a temperature of 230° C.

According to the apparatus for manufacturing a vitreous slag of the present invention, as described above in detail, the following industrially useful effects are provided:

(1) A substantially completely vitrified slag can be manufactured;
(2) The heat obtained during cooling and solidifying of a high-temperature molten slag into a vitreous slag can be recovered very safely in the form of a low-pressure and high-potential high-temperature heat;
(3) It is possible to manufacture a leaf-shaped vitreous slag in uniform-sized pieces, which is excellent in crushability and easy to handle; and,
(4) The installation costs can be minimized.

What is claimed is:

1. An apparatus for manufacturing a vitreous slag, which comprises:

a pair of cooling drums having the same diameter and the same length, the axial directions of said pair of cooling drums being arranged parallel to each other in the same horizontal level, and the peripheral surfaces of said pair of cooling drums being in contact with each other, each of said pair of cooling drums having a center axle;

a driving means for rotating said pair of cooling drums, said driving means being adapted to rotate said pair of cooling drums in directions opposite to each other at the same peripheral speed in the rising direction of the peripheral surface of each of said pair of cooling drums, at the contact portion of said pair of cooling drums;

a pair of weirs provided at the upper halves of the both ends of said pair of cooling drums so as to be in contact with said both ends of said pair of cooling drums, a slag sump being formed by means of said pair of weirs and the bodies of said pair of cooling drums;

a slag feed means, arranged above said pair of cooling drums, for pouring a molten slag into said slag sump;

a scraper provided so as to be in contact with the lower halves of the peripheral surfaces of said pair of cooling drums;

a cooling medium for cooling said pair of cooling drums, said cooling medium being supplied, through the center axle of each of said pair of cooling drums, into each of said pair of cooling drums, said cooling medium exchanging heat with said molten slag in said slap sump, deposited onto the peripheral surfaces of said pair of cooling drums, along with the rotation of said pair of cooling drums, and said cooling medium which has exchanged the heat with said molten slag being discharged through said center axle of each of said pair of cooling drums for heat recovery, whereby said molten slag deposited onto the peripheral surfaces of said pair of cooling drums is converted into a vitreous slag through heat exchange with said cooling medium, along with the rotation of said pair of cooling drums, and peeled off from the peripheral surfaces of said pair of cooling drums by said scraper;

said apparatus being characterized in that:

said cooling medium comprises a high boiling point heat medium having a boiling point under 1 atmospheric pressure of at least 200° C., and said high boiling point heat medium is discharged, through said center axle of each of said pair or cooling drums, from each of said cooling drums under a low pressure of up to 5 kg/cm$^2$.

2. The apparatus as claimed in claim 1, wherein:

each of a pair of pinch rolls having a length substantially equal to that of each of said pair of cooling drums is provided, in the lower half of each of said pair of cooling drums at a position on the upstream side of said scraper relative to the rotating direction of each of said pair of cooling drums, so as to be in contact with said vitreous slag deposited onto the peripheral surface of each of said pair of cooling drums, and each of a pair of spray nozzles is provided adjacent to the peripheral surface of each of said pair of cooling drums for spraying water onto said vitreous slag deposited onto the peripheral surface of each of said pair of cooling drums at a position between said scraper and each of said pair of pinch rolls.

3. The apparatus as claimed in any of claims 1 and 2, wherein:

at least one heat exchanger is provided outside said pair of cooling drums, which communicates with each of said pair of cooling drums through said center axle and a liaison pipe of each of said pair of cooling drums; said high boiling point heat medium is present in two forms of vapor and liquid in each of said pair of cooling drums; and the vaporized high boiling point heat medium is sent from each of said pair of cooling drums to said heat exchanger under the effect of pressure difference between each of said pair of cooling drums and said heat exchanger.

* * * * *

UNITED STATES PATENT AND TRADEMARK OFFICE
CERTIFICATE OF CORRECTION

PATENT NO. : 4,330,264
DATED : May 18, 1982
INVENTOR(S) : Jirou KONISHI et al

It is certified that error appears in the above-identified patent and that said Letters Patent is hereby corrected as shown below:

COLUMN 3, line 23, after "supplied to the" change "pluraity" to --plurality--;

COLUMN 13, line 20, after "slag in said" change "slap" to --slag--;

COLUMN 14 (claim 3), line 25, change "which" to --and--;

line 27, change "axle and a liaison pipe" to --axle and liaison pipes--.

Signed and Sealed this

Fourteenth Day of September 1982

[SEAL]

Attest:

GERALD J. MOSSINGHOFF

*Attesting Officer*    *Commissioner of Patents and Trademarks*